United States Patent [19]
Bolte et al.

[11] Patent Number: 5,872,435
[45] Date of Patent: Feb. 16, 1999

[54] ELECTRICAL DRIVE ARRANGEMENT

[75] Inventors: Ekkehard Bolte, Aachen; Jürgen Halfmann, Herzogenrath; Lutz Scholten, Aachen; Matthias Wendt, Würselen, all of Germany

[73] Assignee: U.S. Philips Corporation, New York, N.Y.

[21] Appl. No.: 711,404

[22] Filed: Sep. 5, 1996

[30] Foreign Application Priority Data

Sep. 8, 1995 [DE] Germany .................. 195 33 161.3

[51] Int. Cl.⁶ .................................................. H02K 23/00
[52] U.S. Cl. .......................... 318/254; 318/138; 318/438
[58] Field of Search .................................. 318/138, 245, 318/254, 280–293, 700–823

[56] References Cited

U.S. PATENT DOCUMENTS

| | | | |
|---|---|---|---|
| 4,818,908 | 4/1989 | Tamae et al. .................... | 310/171 |
| 5,285,135 | 2/1994 | Carobolante et al. ........... | 318/254 |
| 5,298,839 | 3/1994 | Takeda ............................ | 318/254 |
| 5,428,276 | 6/1995 | Carobolante et al. ........... | 318/254 |

FOREIGN PATENT DOCUMENTS 0073503  3/1993  European Pat. Off. .
4136538A1  5/1992  Germany .

*Primary Examiner*—Paul Ip
*Attorney, Agent, or Firm*—Edward Blocker

[57] ABSTRACT

An electrical drive arrangement for an electric motor including a stator having a plurality of phase windings, and a rotor. The drive arrangement includes an electronic commutation circuit to supply electric power to the phase windings of the electric motor, a position sensor device, a phase control circuit coupled to receive the sensor signals and provide resultant sensor signals with a phase shift relative to the phase relationship of the sensor signals, a waveform generator coupled to receive the resultant sensor signals and provide commutation signals, and a control circuit coupled at least to the waveform generator for setting the amplitude and the phase shift of the electric power to be supplied to the motor. The phase control circuit includes a control signal generation circuit, a sensor signal allocation circuit, a delay time determining circuit, a sensor signal output circuit, and a load signal generating circuit. The drive arrangement enables the torque angle, i.e., the phase angle between the magnetic field generated in the stator and the rotor position, to be controlled in dependence upon the movement of the rotor using simple position signals and simple circuitry.

9 Claims, 11 Drawing Sheets

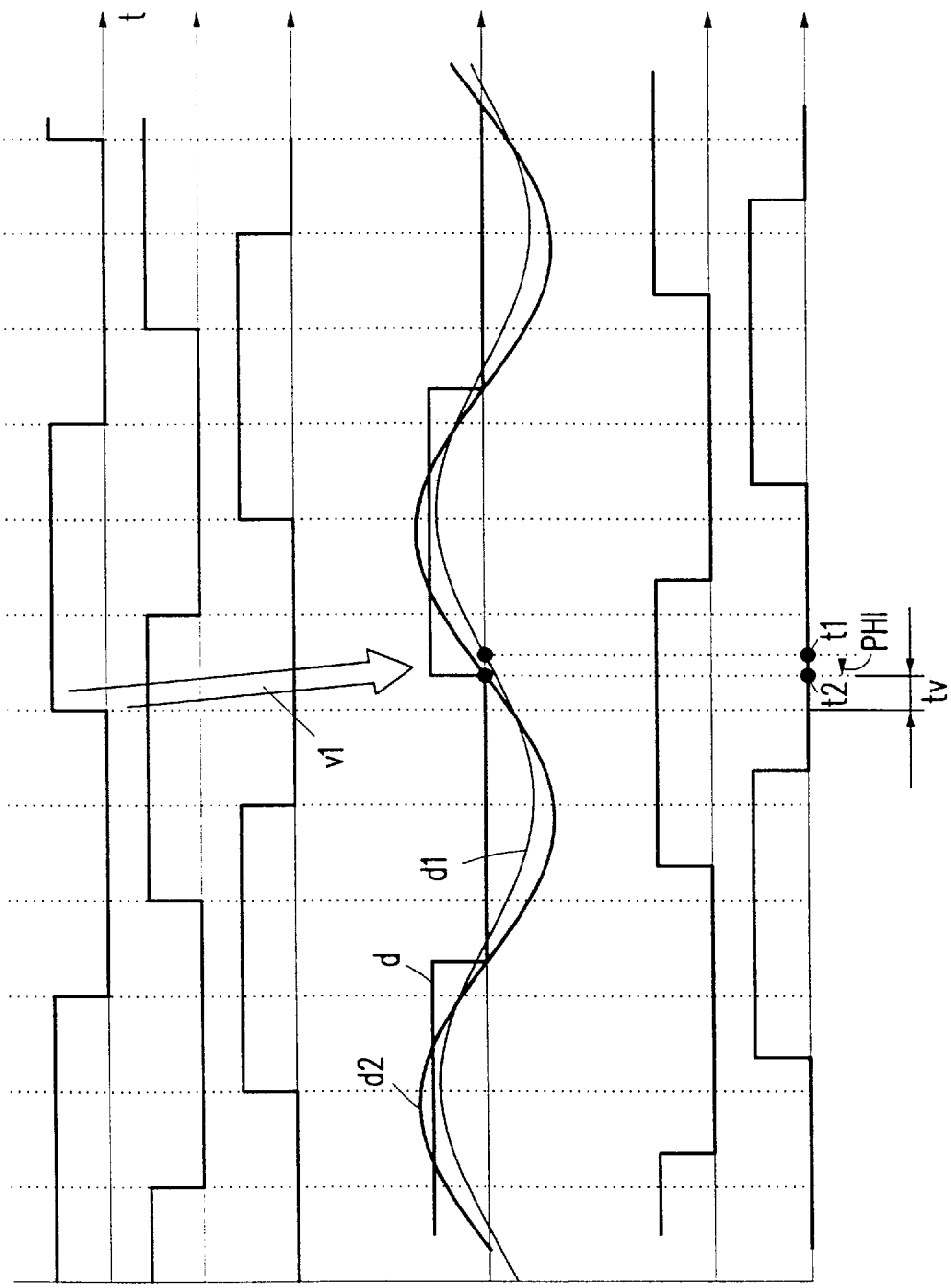

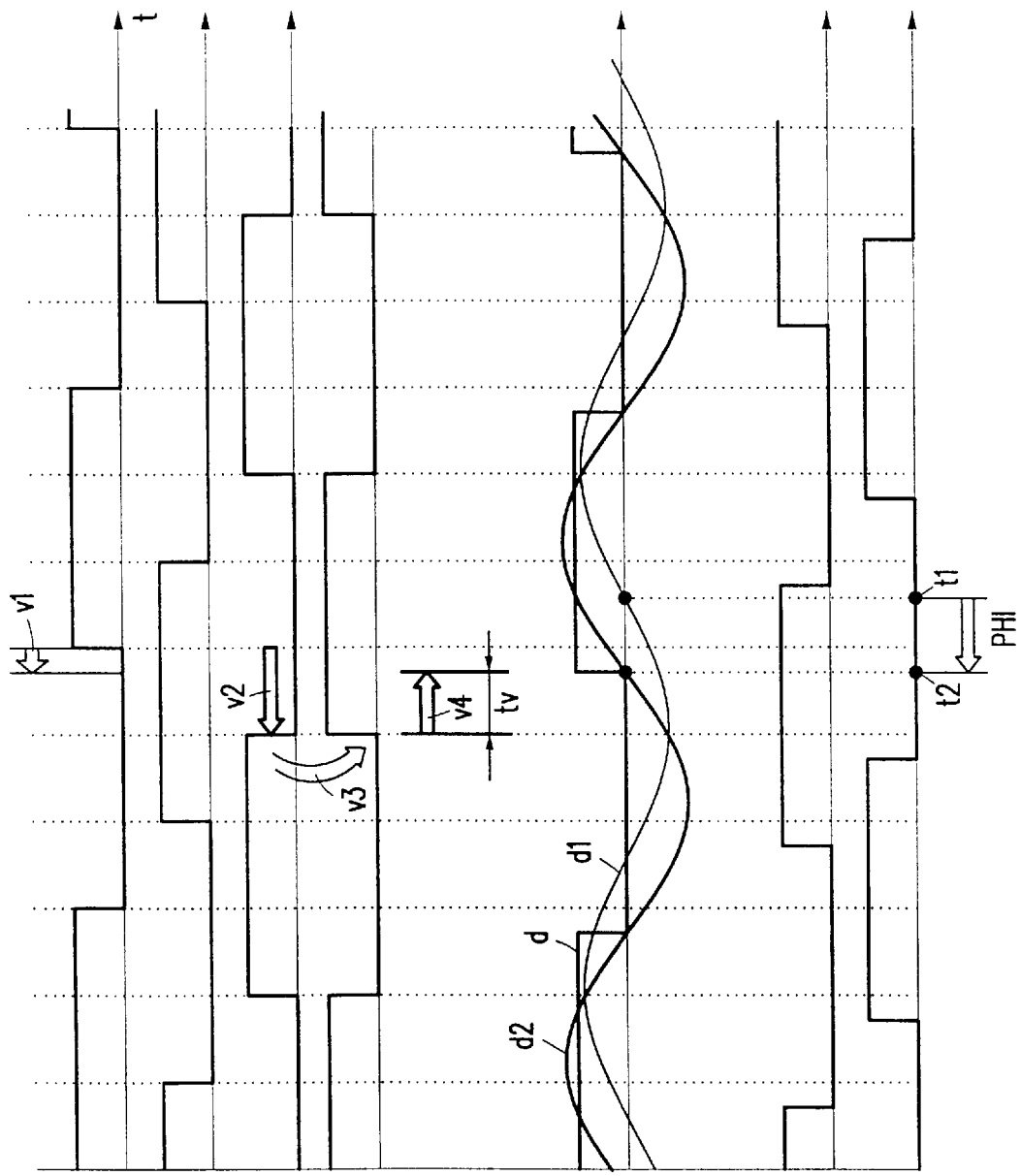

ELECTRICAL DRIVE ARRANGEMENT

BACKGROUND OF THE INVENTION

The invention relates to an electrical drive arrangement.

EP 73 503 B1 describes a motor control system in which the motor, which is a brushless d.c. motor, comprises stator windings, a permanent-magnet rotor and a position sensor to detect the position of said rotor relative to the stator windings, and in which an exciting current generation circuit is responsive to the position signal supplied by the position sensor and is capable of applying sinusoidal exciting currents to the stator windings. The frequency of the sinusoidal exciting currents is then controlled in accordance with the position signal in order to obtain a rotating field in synchronism with the rotation of the rotor. In order to control the phase of the sinusoidal exciting current for dynamically controlling the angle between the rotating magnetic field generated by the stator windings and the rotor position there has been provided a torque angle control circuit coupled to the exciting current generation circuit. The control system further comprises a tachometer coupled to the rotor to detect the rotor speed, the tachometer being coupled to the torque angle control circuit in such a manner that the phase of the sinusoidal exciting current varies in dependence on the rotor speed. The position sensor particularly supplies digital signals representative of the rotor position and the tachometer accordingly supplies signals representative of the rotor speed. Torque angle factors have been stored in a memory and there have been provided means to select torque angle factors in this memory in accordance with the digital rotor speed signals and to add the selected torque angle factor to the digital rotor position signal, in order to derive a signal for the excitation vector position. The known motor control system further comprises exciting current generation means by which the windings can be energized with sinusoidal exciting currents whose values are proportional to the sinusoidal values, which are incrementally controlled in conformity with the excitation vector position signal.

DE 41 36 538 A1 describes a commutator circuit for a brushless d.c. motor with trapezoidal drive, in which the commutation pulses of the commutation encoder of the brushless d.c. motor can be optimized in that the commutation pulses are advanced while at the same time the commutation pulse width is optimized. This is in order to enable a maximum efficiency or a maximum power and a maximum torque of the motor to be obtained over the entire range of motor speeds and the entire range of motor loads. This commutation uses inter alia a ROM address section with a presettable up-counter, which counts up clocked by the output signal of a binary counter and which for each reference commutation pulse is preset with the advance commutation angle as preset value in accordance with the prevailing angular velocity of the motor and the load current, which is read into a ROM, which has been loaded with data formed by the advance commutation angle of the commutation pulse, under control of the output signal of an address section, which supplies an address signal to the ROM.

The motor control system in accordance with EP 73 503 B1 requires a very accurate resolution of the digital signals representing the rotor position, which resolution should be at least 8 bits. The commutator circuit in accordance with DE 41 36 538 A1 comprises extensive memory circuits and address sections for these memory circuits.

OBJECTS AND SUMMARY OF THE INVENTION

It is an object of the invention to provide an electrical drive arrangement which enables the torque angle, i.e. the phase angle between the magnetic field generated in the stator and the rotor position, to be controlled in dependence upon the speed of movement of the rotor using simple position signals and simple circuitry. According to the invention this object is achieved by means of an electrical drive arrangement comprising

- an artificially excited electric motor comprising a stator, having windings arranged as a plurality of phase winding, and a rotor,
- an electronic commutation circuit for energizing the phase windings of the electric motor with electric power,
- a position sensor device for supplying a sensor signal for each phase winding of the electric motor in dependence upon an instantaneous position of the rotor relative to the stator, each of the sensor signals being in an impressible phase relationship with respect to the position of the rotor,
- a phase control stage or circuit for subjecting the phase relationship of the sensor signals to a phase shift which depends at least on the speed of movement of the rotor and which is uniform for all the sensor signals, as a result of which resultant sensor signals are obtained,
- a waveform generator, to which the resultant sensor signals can be applied and in which commutation signals for the associated phase winding are derived from each of the resultant sensor signals, in order to control in the commutation circuit the variation in time and the amplitude of the electric power to be applied to the electric motor, and
- a control stage or circuit for controlling the amplitude and the phase shift of the electric power supply to the electric motor in dependence upon at least the speed of movement of the rotor, the phase control stage comprising:

- a control signal generation stage or stage which, for the value of the phase shift currently impressed by the control stage, selects for each individual sensor signal from the multitude of all the sensor signals that one as a substitute sensor signal, which directly or in inverted form by means of a minimal delay can be given the phase relationship of the resultant sensor signal to be derived from said individual sensor signal, and which stage is capable of supplying control signals containing information about this selection,
- a sensor signal allocation stage, to which the sensor signals from the position sensor device can be applied and in which under control of the control signals the substitute sensor signals are derived from the sensor signals and are made available,
- a delay time determining stage or circuit for determining, from the currently impressed value for the phase relationship, the speed of movement of the rotor as well as the spacing between the phases of the sensor signals along a movement coordinate describing the position of the rotor, a time interval (delay time) corresponding to the delay between each of the substitute sensor signals and the resultant sensor signal to be derived therefrom,
- a sensor signal output stage, to which the substitute sensor signals can be applied and which, in response to a load signal, can be loaded with and can supply the resultant sensor signals, and
- a load signal generating stage, or circuit in which upon each change of the value of one of the sensor signals or the substitute sensor signals the load signal can be generated anew and can be applied to the sensor signal output stage, delayed relative to this change by the delay time determined in the delay time determining stage.

In the electrical drive arrangement in accordance with the invention the elements referred to as stator and as rotor may be rotationally or linearly movable relative to one another; moreover, the case should be included in which the element referred to as stator is movable and the element referred to as rotor are disposed so as to be stationary relative to a movement coordinate of the drive arrangement. In that case the position of the rotor is to be replaced by a corresponding position of the stator. However, for the sake of clarity it is assumed hereinafter that the rotor moves relative to the stator. The position of the rotor can then be described by a movement coordinate which is stationary relative to the stator. The position sensor device is then also stationary relative to the stator. The electric motor has been constructed in such a manner that cyclically recurring identical constellations between the rotor and the stator are obtained along the movement coordinate; for a rotary electric motor this is preferably one revolution of the rotor; this applies in a corresponding manner to a linear electric motor. The sensor signals from the position sensor device then exhibit certain phase relationships measured with respect to this movement cycle of the rotor and a zero point selected for the movement coordinate. In a modification thereof it is also possible to select a coordinate system having a movement coordinate with a separate zero point for each phase winding. The zero point of each of the movement coordinates is then selected in such a manner that the associated sensor signal of each phase winding each time has the same phase relationship with respect to its movement coordinate. It is common practice to arrange the position sensor device in such a manner relative to the stator or the rotor that the sensor signals assume a phase relationship with respect to the rotor in which they produce in the waveform generator such a variation of the supply of electric power via the movement coordinate of the rotor, that an optimum power output or an optimum torque of the electric motor is achieved at least in a given operating point of the electric motor, i.e. for a given load and a given speed of movement. As is also apparent from the cited prior-art documents, the phase angle between the sensor signals and the electric power applied to the phase windings of the electric motor can be controlled to set this operating point. In the drive arrangement in accordance with the invention this is effected by means of the phase control stage, in which all sensor signals are subjected to a similar phase shift, which then appears directly as a phase shift of the supply of electric power relative to the position of the rotor along the movement coordinate. In order to achieve an optimum torque and hence an optimum efficiency of the drive arrangement in accordance with the invention in all the operating ranges the phase shift can be made dependent on not only the speed of movement of the rotor but, for example, also on the load of the electric motor, i.e. the torque to be generated. This phase shift, together with the amplitude of the electric power applied to the electric motor, is determined in the control stage.

Thus, the drive arrangement in accordance with the invention is based on a construction which can also be used for a drive arrangement with invariable phase of the sensor signals for the supply of the electric power. The invention merely adds the phase control stage. From the sensor signals from the position sensor device this control stage derives the resulting sensor signals for the waveform generator by subjecting the phase of the sensor signals to an additional phase shift, which is positive or negative relative to the movement coordinate of the rotor. The invention is based on the recognition of the fact that a negative phase shift, i.e. a forward shift (in time or also relative to the movement coordinate) of the sensor signals gives rise to problems, particularly in the case of simple rectangular sensor signals, whose period corresponds to one cycle of movement of the rotor. In the prior art these problems are partly solved in that the position sensor supplies a position signal which has a very fine gradation along the movement coordinate, which is converted into digital form to give a desired phase shift. This method cannot be used with said simple sensor signals. Therefore, in accordance with the invention, a negative phase shift is also realized by a time delay of the sensor signals. However, this is not effected in the theoretically simple manner in which a negative phase shift is expressed as a complementary positive phase shift with respect to the entire cycle of movement, because this would lead to very long delays, which on the one hand are technically more difficult to convert and on the other hand would give rise to disadvantages in the operation of the electric motor.

In accordance with the invention two steps which are adapted to one another are performed. In the first step it is determined for the desired phase shift, from which of the sensor signals or, if desired, the inverse thereof the respective desired resultant sensor signal can be derived by a minimal positive phase shift or time delay. This information is derived in the control signal generating stage and is supplied by this stage in the form of the control signals. Thus, the control signals contain information about the choice of a substitute sensor signal for each of the sensor signals and, in addition, information about whether the substitute sensor signal for one of the sensor signals should be used in inverted or non-inverted form. The substitute sensor signals are derived from the sensor signals themselves in the sensor signal allocation stage.

Pursuant to this determination of the substitute sensor signals the delay-time determining stage determines the delay time by which the respective substitute sensor signal is to be delayed in order to derive the resultant sensor signal to be allocated to the relevant sensor signal. This delay time depends on the phase shift to be obtained and on the speed of movement of the rotor. Moreover, a factor which plays a part in determining the substitute sensor signals, and consequently the delay time, is how the phase relationships of the sensor signals are situated or spaced apart along the movement coordinate of the rotor over one cycle of movement of the rotor.

In an electrical drive arrangement in accordance with the invention the substitute sensor signals are delayed in order to obtain the resultant sensor signals in that the substitute sensor signals are read into the sensor signal output stage by the load signal. From the read-in instant they are available as resultant sensor signals at the sensor signal output stage. The load signal is generated in the load signal generating stage in such a manner that the substitute sensor signals are read in delayed by the delay time. For this purpose, a load signal is generated upon each change, i.e. upon each signal edge in one of the sensor signals, which load signal causes the substitute sensor signal to be read into the sensor signal output stage as a resultant sensor signal delayed with respect to this edge by said delay time.

The invention can be applied to electronically commutated artificially excited (i.e. also permanent-magnet excited) electric motors, as commonly used as drive motors for domestic appliances, electronic home-entertainment and medical equipment, but also for professional uses. Domestic appliances also include body-care appliances. The invention thus simply enables operation with an optimum efficiency to be obtained in several operating points. An example of such a use are food processors which must be operated at a very low speed for kneading and at a very high speed for mixing. The method in accordance with the invention now enables operation with an optimum efficiency for each of the respective tasks. Moreover, the comparatively simple circuitry required for the invention is favorable for low-cost series production in large quantities.

The phase control of the sensor signals in accordance with the invention in a simple manner enables not only an optimum driving torque to be obtained but also a maximal braking torque for braking operation. This allows the use as an electrical brake in a very simple and effective manner, particularly in those cases where a high reliability is to be obtained at low cost. An example of this is again in domestic appliances, for example a food processor, or in electrical drives for machine tools.

A further advantage of the invention is that the position of the position sensor device along the movement coordinate of the rotor is no longer rigidly linked to a fixed phase relationship. This makes it possible to select the most favorable location for mounting the position sensor device for constructional reasons or for reasons of electromagnetic compatibility, without the operation of the electric motor being adversely affected thereby. Thus, the construction can be simplified and an improved immunity to interference of the sensor signals can be achieved.

The invention further allows arbitrary adjustments of the phase relationship between the sensor signals and the power supply to the electric motor, without thereby limiting the control range of the amplitude of this power or the amplitude of the voltages across the phase windings of the stator. Moreover, in the electrical drive arrangement in accordance with the invention the phase control stage can be combined with different waveform generators.

In an advantageous embodiment the electrical drive arrangement in accordance with the invention comprises a control signal modification stage to which the control signals from the control signal generation stage as well as a direction-of-movement signal can be applied and by which the control signals, under control of the direction-of-movement signal, can be converted into direction-of-movement-corrected control signals, enabling the substitute sensor signals to be derived correctly from the sensor signals for the prevailing direction of movement of the rotor.

The control signal modifying stage simply derives substitute sensor signals, corrected for the direction of movement, from the substitute sensor signals supplied by the sensor signal allocation stage. This makes it possible to obtain an arbitrary control of the phase relationship or the phase shift for both directions of movement of the electric motor. In the same way as the entire phase control stage in relation to the other elements of the electrical drive arrangement, the control signal modifying stage also exhibits a kind of modular structure within the phase control stage. This means that an electrical drive arrangement can be operated with but also without a phase control stage in accordance with the invention. Likewise, the control signal modifying stage can be included without any adaptation of the other elements of the drive arrangement in accordance with the invention, if a drive arrangement is to be constructed optionally for two directions of movement.

In a preferred embodiment of the drive arrangement in accordance with the invention it comprises a direction-of-movement detection stage for detecting the current direction of movement of the rotor and for supplying the accordingly formed direction-of-movement signal to the control signal modification stage. The direction-of-movement detection stage can also be included as a kind of module without any adaptation of the other elements of the drive arrangement in accordance with the invention. Preferably, the current direction of movement can be determined by the direction-of-movement detection stage by means of a comparison of the phase relationship of at least two of the sensor signals.

In order to determine the speed of movement of the rotor the electrical drive arrangement in accordance with the invention preferably includes a speed measuring stage. This can be a tachogenerator which is known per se. However, in a preferred embodiment a speed measuring stage is used which directly evaluates the sensor signals and which enables a separate tachogenerator to be dispensed with. In such a speed measuring stage the succession in time of given portions of the sensor signals is comparable with a time standard in the speed measuring stage, and a speed signal representative of the speed of movement is derivable from this comparison in order to be supplied to the delay time determining stage. For this purpose, it is possible, for example, to measure a time interval between the last two signal edges of the sensor signals and compare it with the time standard, or it is possible to count the signal edges of the sensor signal appearing within a given time standard. The first method is to be preferred particularly for low speeds of movement; however, it may also be considered to use a combination of both methods, for example to use the first-mentioned method for low speeds of movement and to use the last-mentioned method for high speeds of movement.

In another embodiment the electrical drive arrangement in accordance with the invention is characterized in that at least portions of the voltages induced in the stator by the movement of the rotor are used for the generation the sensor signals in the position sensor device, and the phase shift impressed on the sensor signal of each phase winding by the phase control stage determines the phase relationship of the associated phase voltage. The phase voltage is to be understood to mean that voltage which is applied to the associated phase winding by the commutation circuit in order to energize this winding with electric power. The induced voltages can then be evaluated directly by electronic means; this make sit possible to dispense with separate mechanical devices for determining the position of the rotor; the position sensor device is then formed by a simple electronic circuit.

Although the electrical drive arrangement in accordance with the invention can handle sensor signals with different waveforms, it is preferable that the position sensor device generates rectangular sensor signals, whose edges form a measure of the position of the rotor relative to the associated phase winding. In that case it is particularly simple if the rectangular sensor signals have a duty cycle of at least 50% and their phases are cyclically substantially equispaced over one cycle of movement of the rotor. Preferably, one period of the rectangular sensor signal then corresponds to one cycle of movement of the rotor.

BRIEF DESCRIPTION OF THE DRAWINGS

An embodiment of the invention of the invention is shown in the drawings and will be described in more detail hereinafter. In the drawings FIGS. 2 to 4 are diagrams to illustrate the phase shifting process in the electrical drive arrangement in accordance with the invention.

Like elements in the various Figures bear the same reference symbols.

DESCRIPTION OF THE PREFERRED EMBODIMENTS

Figure 1:
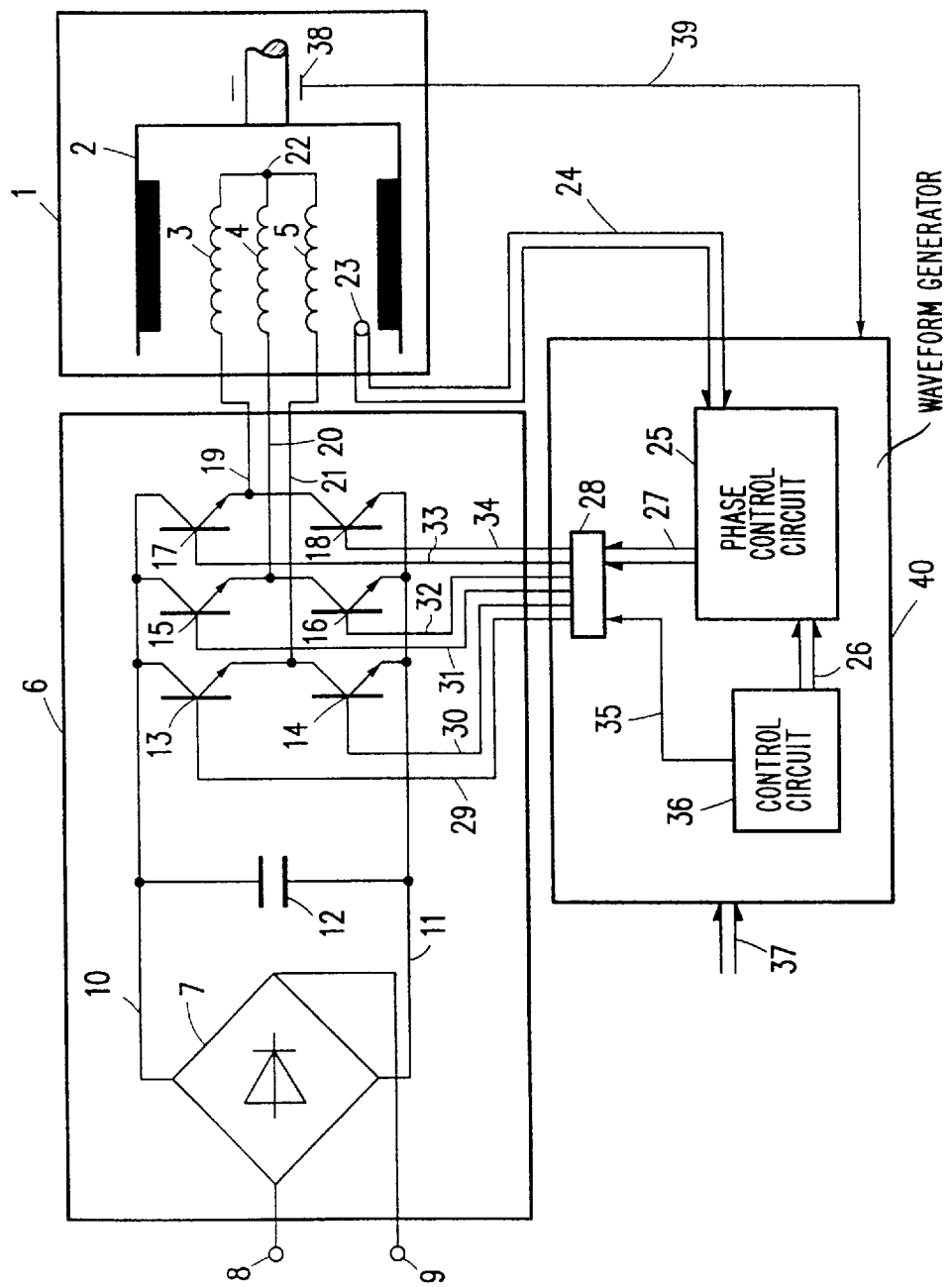
FIG. 1 is a block diagram of an electrical drive arrangement in accordance with the invention.

FIG. 1 shows diagrammatically an electric motor 1 having a stator and a permanent-magnet rotor 2. The stator carries windings, in the present example arranged as three phase windings 3, 4, 5. In this example, the three phase windings 3, 4, 5 preferably form a three-phase system. They are energized with electric power by an electronic commutation circuit 6. The electronic commutation circuit 6 comprises a mains rectifier 7, to whose input terminals power can be applied, preferably from an a.c. mains. The mains rectifier 7 supplies the electric power as a d.c. supply voltage at output terminals 8, 9, between which a smoothing capacitor 12 has been arranged. Moreover, three series arrangements of two electronic switching devices each, shown symbolically as bipolar transistors in the example of FIG. 1, have been arranged between the output terminals 10, 11 of the mains rectifier 7. These switching devices bear the reference numerals 13, 14; 15, 16 and 17, 18, respectively. The node of each of the two series arrangements of two switching devices 13 and 14, 15 and 16, and 17 and 18, respectively each form a tap 19, 20, 21 of the electronic commutation circuit 6. The first tap 19 is connected to the first phase winding 3, the second tap 20 to the second phase winding 4, and the third tape 21 to the third phase winding of the stator; the second terminals of each of the phase windings 3, 4, 5 are coupled to a common node 22. Thus, as a three-phase system the phase windings 3, 4, 5 thus form a star connection.

The electric motor 1 in FIG. 1 further comprises a position sensor device 23, shown symbolically, which supplies a sensor signal for each of the phase windings 3, 4, 5 of the electric motor via a line 24. This sensor signal provides information about the instantaneous position of the rotor relative to the associated phase winding 3, 4 or 5 of the stator. If a movement coordinate is defined for the position of the rotor 2, one revolution of the rotor 2 corresponding to one cycle of movement, each of the sensor signals assumes a given phase relationship with respect to this movement coordinate. The phase relationship then depends on the construction and placement of the position sensor device.

The line 24 for the sensor signals is connected to a phase control stage 25, which further receives a signal via a line 26, which signal contains information about a desired value for the phase relationship of the sensor signals. The resultant sensor signals thus generated by the phase control stage 25 are applied to a waveform generator 28 via a line 27. This waveform generator 28 derives commutation signals for the associated phase winding 3, 4 or 5 of the stator from the resultant sensor signals received via the line 27, which commutation signals are applied to the control terminals of the switching devices 13, 14, 15, 16, 17 and 18 via lines 29, 30, 31, 32, 33 and 34, respectively. By means of these commutation signals the waveform generator 28 controls the switching devices 13 to 18 in such a manner that the electric motor 1 is essentially driven by the fundamental waves of the voltages generated across the phase windings 3 to 5, which voltages preferably produce a three-phase rotary field in the example of FIG. 1. For this purpose, it is advantageous to control the switching devices 13 to 18 with pulse-width modulated signals. The amplitude of the fundamental wave of the voltage across a phase winding 3, 4 or 5 or its r.m.s. value is also determined by the waveform generator 28, which for this purpose receives a signal carrying information about this via a line 35. In this way, the waveform generator 28 controls the energy flow in the electric motor.

The lines 26 and 35 for the signals with information about the desired value for the phase relationship of the sensor signals and about the amplitude or the r.m.s. value of the voltage across the phase windings 3, 4 and 5 are connected to a control stage 36. The control stage 36 is adapted to control the amplitude and the phase shift of the electric power supply to the electric motor 1. In the control stage 36 the signals on the lines 26 and 35 are influenced, for example, by preset information for the desired speed of movement of the rotor but, if desired, also by the load of the electric motor 1. This external information is represented diagrammatically by a line 37. The control stage 36 can then generate a signal on the line 35, for example by a variance comparison for the speed of movement of the rotor 2, and a signal about the associated desired value for the phase relationship of the resultant sensor signals on the line 27 can be supplied via the line 26, for example in conformity with the actual value of the speed of movement of the rotor 2. The speed of movement of the rotor 2 can be determined in a tachogenerator 38., which supplies a corresponding signal via a line 39. In a variant of the electrical drive arrangement of FIG. 1 it is also possible to use a speed measuring stage for this purpose, which evaluates the sensor signals from the position sensor device 23. The tachogenerator can then be dispensed with.

The modular construction of the electrical drive arrangement is apparent from FIG. 1. Indeed, if the phase control stage 25 is removed and the line 24 is connected directly to the line 27, a version with an unchanged phase relationship of the (resultant) sensor signals is obtained without any adaptation of the other elements.

Whereas in FIG. 1 the circuit elements involved in the power supply to the electric motor 1 have been combined in the electronic commutation circuit 6, all the elements used for controlling have been included in an assembly 40.

Figures 2A, 2B, 2C, 2D, 2E, 2F:
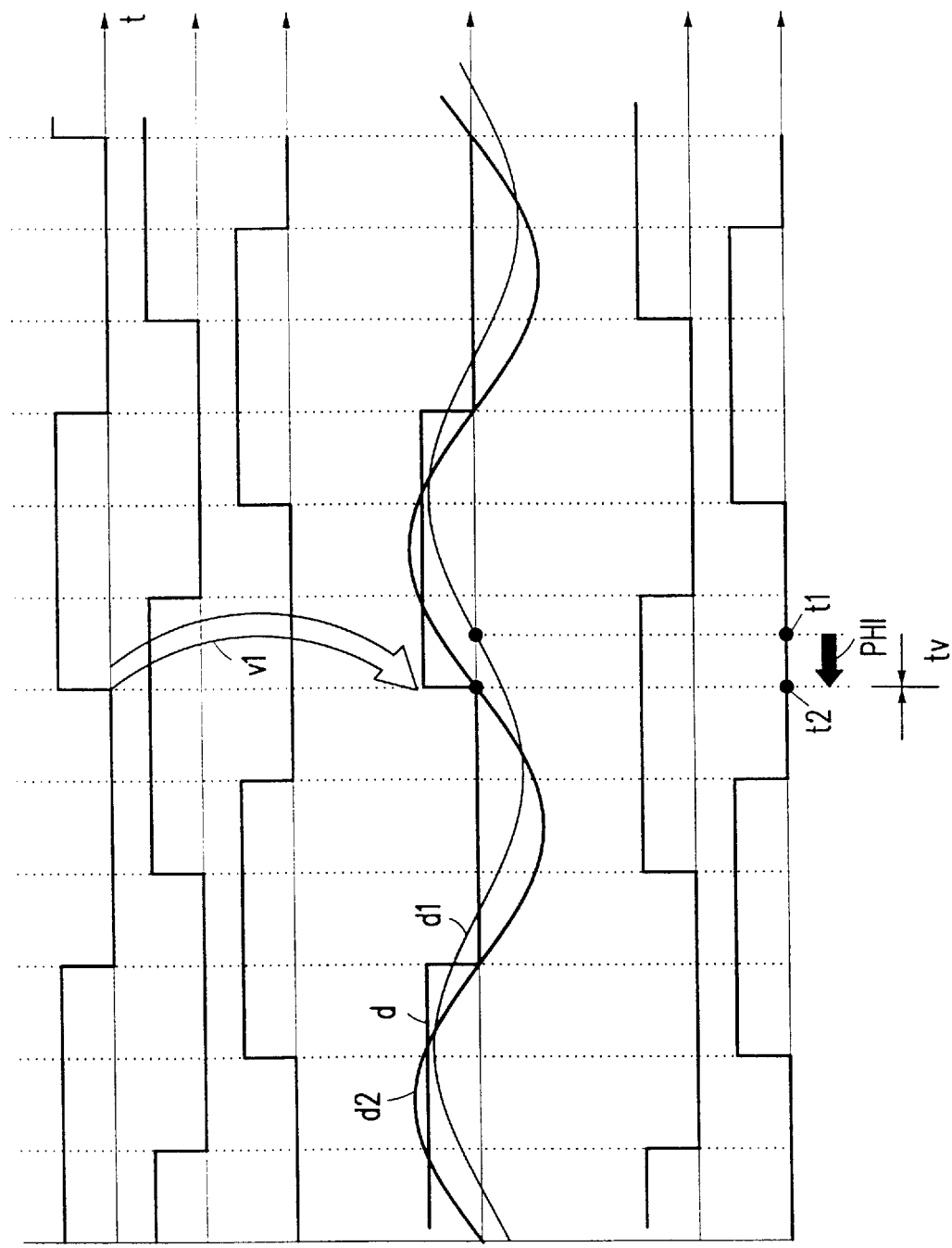

The basic operation of the phase control stage 25 will be described hereinafter with reference to FIGS. 2 to 4. FIG. 2 is based on the assumption that the phase control stage 25 does not introduce a phase shift in the sensor signals. This means that FIG. 2 illustrates an operational situation which would also be obtained without the phase control stage 25. FIG. 2a shows the sensor signal for the first phase winding 3 of the stator as a function of time. Therein, the letter t refers to the time, but FIG. 2a may just as well be regarded as a diagram in which the sensor signal for the first phase winding 3 has been plotted as a function of the movement coordinate of the rotor 2. For the sake of simplicity it has been assumed that the time covered by the diagram of FIG. 2 is period of constant speed of movement of the rotor 2. FIGS. 2b and 2clikewise show the sensor signals for the second phase winding 4 and for the third phase winding 5, respectively, as functions of time. All the sensor signals have a rectangular waveform whose period corresponds to one cycle of movement, in the present case one revolution, of the rotor 2. The duty cycle of the rectangular sensor signals shown in FIGS. 2a to 2c is 50% and the phase positions of these signals with respect to the time coordinate t (or the movement coordinate) are cyclically equispaced over one cycle of movement of the rotor 2. This corresponds to the aforementioned three-phase system.

The example shown in FIG. 2 is based on the assumption that the phase relationship of the sensor signals is referred to the phase relationship of a voltage induced in the stator by the movement of the rotor 2. This induced voltage is shown by way of example as a sinewave d1 in FIG. 2d. The fundamental wave of the voltage across the first phase winding 3 (phase voltage) for energizing this phase winding 3 is referenced d2. In conformity with the construction of the waveform generator 28, the rectangular waveform of the resultant sensor signal for the first phase winding, which waveform is shown as d in FIG. 2d, is necessary to generate the fundamental wave d2 of the phase voltage across the first phase winding 3. In the example of FIG. 2 this resultant sensor signal is identical to the associated sensor signal from the position sensor device 23, because it has been assumed that the phase shift is zero. Consequently, the desired delay time tv is also zero. In addition, FIG. 2 gives the instant t1 of a zero crossing of the voltage d1 induced in the first phase winding 3 by the movement of the rotor 2, and the instant t2 of the associated zero crossing of the fundamental wave d2 of the phase voltage across the first phase winding 3. PHI is the phase angle between the fundamental wave d2 of the phase voltage and the induced voltage d1. This phase angle PHI, in conjunction with the phase relationship of the sensor signal or, in the present example, the phase of the induced voltage d1 which is in a fixed phase relationship therewith, determines the phase relationship of the resultant sensor signal d and thus the fundamental wave d2 of the phase voltage. The phase control stage 25 controls the phase shift via the given phase angle PHI, information about the desired value of this phase angle PHI being applied via the line 26.

In the same way as the resultant sensor signal of FIG. 2d is derived from the sensor signal of FIG. 2a without delay (tv=0), the resultant sensor signal of FIG. 2e for the second phase winding 4 is derived from the sensor signal of FIG. 2b and the resultant sensor signal of FIG. 2f for the third phase winding 5 from the sensor signal of FIG. 2c.

FIG. 3 shows an operational case in which, in contradistinction to FIG. 2, the phase control stage 25 delays the resultant sensor signals relative to the associated sensor signals from the position sensor device 23. The resultant sensor signals and, as consequence, the fundamental wave d2 of the phase voltage are then phase-shifted towards a later instant. The required delay time tv corresponds directly to this phase shift. In the example of FIG. 3 this results in a decrease of the magnitude of the phase angle PHI, i.e. the phase lead of the fundamental wave d2 relative to the induced voltage d1 is reduced. The signal waveforms in FIGS. 3a to 3c are identical to those in FIGS. 2a to 2c but FIGS. 3d to 3f show the waveforms of the resultant sensor signals delayed by tv.

FIG. 4 shows an example of phase shift control by means of the phase control stage 25, in which the magnitude of the phase angle PHI is to be increased as compared with the situation without delay in FIG. 2. This results in a negative delay between the sensor signal and the resultant sensor signal to be derived therefrom. In the example shown in FIG. 3 each of the resultant sensor signals has been derived directly from its associated sensor signal, which means for example that the resultant sensor signal for the first phase winding 3 has been derived directly from the sensor signal for the first phase winding obtained from the position sensor device 23 etc. Since the delay to be applied in the example of FIG. 3 is small, the sensor signal from the position sensor device 23 now directly constitutes the substitute sensor signal itself, i.e. for example the sensor signal of FIG. 3a for the first phase winding 3 also forms its substitute sensor signal etc. This is because the sensor signal for the first phase winding can be given the phase relationship of the resultant sensor signal shown in FIG. 3d for the first phase winding 3 with the smallest possible delay.

Conversely, in the case of FIG. 4 the situation occurs that a delay of almost one full period of the sensor signals, i.e. almost one complete cycle of movement of the rotor 2, would be necessary in order to give the sensor signal supplied to, for example, the first phase winding 3 by the position sensor device 23 the phase relationship of the resultant sensor signal for the first phase winding 3. Apart from the additional means required for such long delay times, these delays also give rise to a very slow response of the electric motor 1 to possible changes of the speed of movement. Therefore, in accordance with the invention, a substitute sensor signal for each individual sensor signal is selected from the multitude of all the sensor signals. This selection is effected in such a manner that the substitute sensor signal, either directly or in inverted form, can be given the phase relationship of the resultant sensor signal for the relevant phase winding by means of a minimal delay. Thus, the delay time tv is always as small as possible. In FIG. 4 this is shown for example for the sensor signal for the first phase winding 3 in accordance with FIG. 4a. From this sensor signal a resultant sensor signal as shown in FIG. 4d should be derived, which corresponds to a shift in the phase-lead direction as indicated by the arrow v1. Starting from the sensor signal from the position sensor device 23 as shown in FIG. 4a the nearest signal edge of one of the three sensor signals of FIGS. 4a to 4c in the direction of this phase shift v1 is now determined. This nearest signal edge is present in the sensor signal for the third phase winding 5. This search process is symbolized by the arrow v2 in FIG. 4.

Since the original signal edge in the sensor signal is a rising signal edge but the signal edge found during the search in accordance with the arrow v2 is a falling edge, the sensor signal thus found is inverted in a further step indicated by an arrow v3, in order to form the substitute sensor signal. The signal thus formed and shown in FIG. 3cc then represents the substitute sensor signal for the sensor signal of the first phase winding.

The process described above is preferably used for sensor signals having a duty cycle of at least substantially 50%. However, if inversion of a sensor signal yields a signal which is neither usable as a resultant sensor signal by delaying, the search symbolized by the arrow v2 should be continued until a similarly oriented signal edge is found. In the example of FIG. 4 the substitute sensor signal could be the sensor signal for the second phase winding shown in FIG. 4b; in this case the delay time tv would be prolonged by ⅙ of the cycle of movement.

Finally, the arrow v4 in FIG. 4 symbolizes the delay of the substitute sensor signal in FIG. 4cc by means of which the resultant sensor signal d in FIG. 4d for the first phase winding 3 is obtained. It appears that in spite of the substantial negative phase shift corresponding to a increase of the magnitude of the negative phase angle PHI a positive delay time tv of small magnitude is obtained. Thus, phase shifts in both directions are attainable with the aid of simple delays by short delay times, which is beneficial for a rapid response to possible speed variations and a more accurate control of the phase angle also in dynamic situations.

Figure 5:
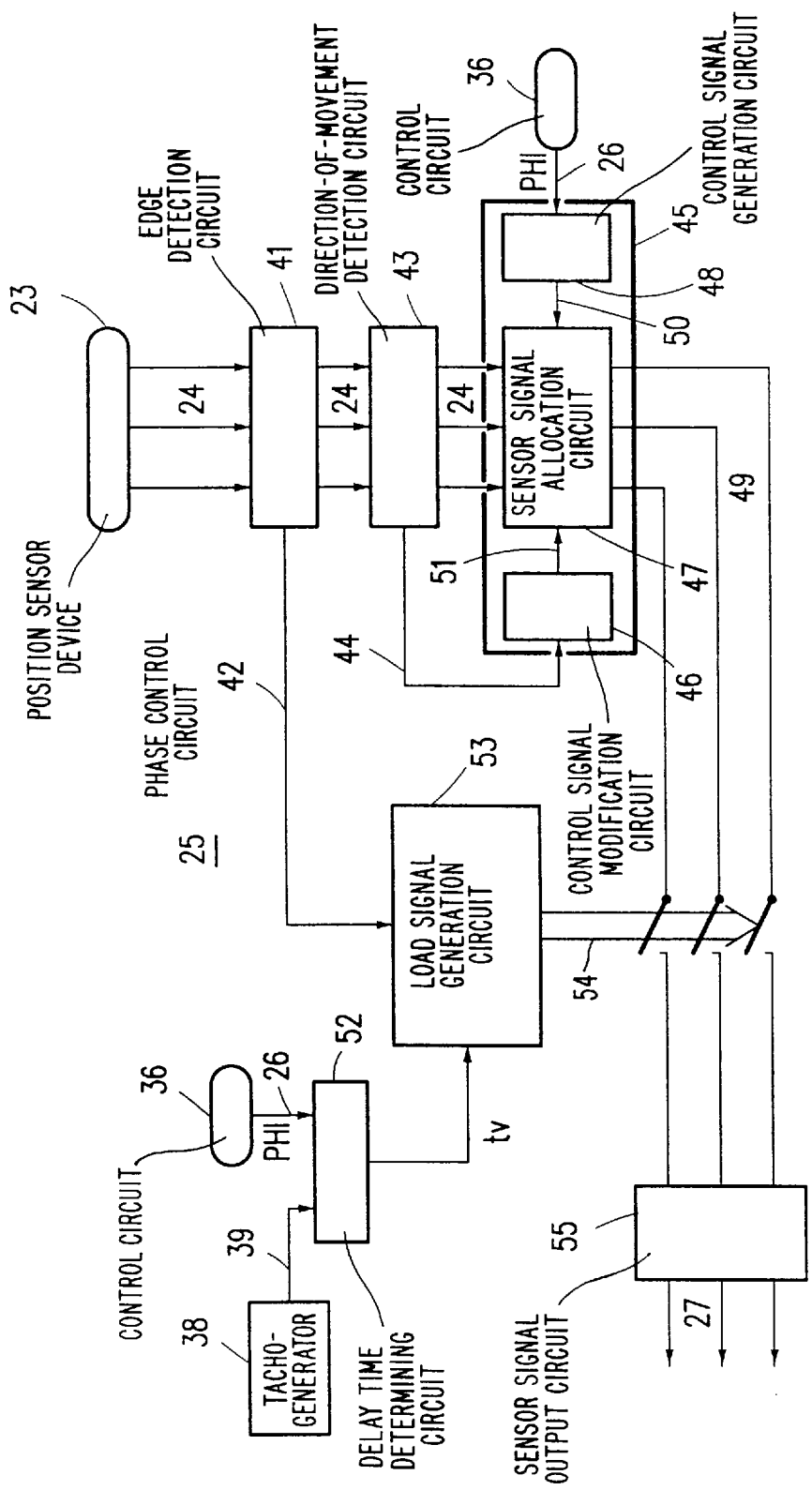
FIG. 5 is a block diagram to explain the operation and the signal flow in a phase control stage of the electrical drive arrangement in accordance with the invention.

FIG. 5 shows a block and signal-flow diagram to illustrate the construction and operation of the phase control stage of the electrical drive arrangement in accordance with the invention by means of an example. In this example the position sensor device 23 applies the sensor signals to the phase control stage 25 via the lines 24 in the manner described above. In a first step all the signal edges in all the sensor signals are detected in an edge detection stage 41. Each time that a signal edge occurs in one of the sensor signals the edge detection stage 41 generates a delay start signal on a start line 42, preferably in the form of a short pulse. In the next step the sensor signals are applied from the line 24 to a direction-of-movement detection stage 43. This stage produces a direction-of-movement signal on a direction-of-movement signal line 44.

In the third step the sensor signals are applied from the line 24 to a block 45, which combines the functions of a control signal modification stage 46, a sensor signal allocation stage 47 and a control signal generation stage 48. The signal with information about the desired value for the phase relationship of the sensor signals, i.e. about the phase angle PHI, is then applied from the control stage 36 to the control signal generation stage 48 via the line 26. The control signal modification stage 46 is connected to the direction-of-movement signal line 44 for the application of the direction-of-movement signal.

The block 45 in FIG. 5, particularly the sensor signal allocation stage, receive the sensor signals from the line 24 to derive direction-of-movement-corrected substitute sensor signals, which are fed out via the lines 49. To form these direction-of-movement-corrected substitute sensor signals, information from the control signal generation stage 48 and from the control signal modification stage 46 is used. An example of the construction of these stages will be described in more detail hereinafter. As explained with reference to FIG. 4, information about how the substitute sensor signal for each of the sensor signals is selected by the position sensor device 23 can be derived from the known variation in time of the sensor signals and the desired phase angle PHI. This information is available in the form of control signals applied to the sensor signal allocation stage 47 by the control signal generation stage 48. In block 45 this is represented diagrammatically as a connection 50. Moreover, the control signal modification stage 46 derives information from the direction-of-movement signal about how the allocation or the derivation of the substitute sensor signals from the sensor signals from the position sensor device 23 should be corrected in conformity with the detected direction of movement. By means of this information, whose transfer is represented diagrammatically as a connection 51 in the block 45, direction-of-movement-corrected substitute sensor signals are derived from the substitute sensor signals. In an example described hereinafter, this is preferably effected in that use is made of said information for deriving direction-of-movement-corrected control signals from the control signals received from the control signal generation stage 48.

The delay time by which the (direction-of-movement-corrected) substitute sensor signals should be delayed in order to obtain the resultant sensor signals is calculated in a delay time determining stage 52. Since the magnitude of the delay time tv depends on speed of movement and the phase angle PHI, the delay time determining stage 52 should receive appropriate information from the control stage 36 via the line 26 and from the tachogenerator 38 via the line 39. Instead of the tachogenerator 38 it is possible, as already stated, to use another source supplying a signal with information about the speed of movement of the rotor 2.

The delay time determining stage 52 supplies information about the magnitude of the delay time tv to a load signal generation stage 53. This load signal generation stage 53 further receives information about the positions of the edges of the sensor signals, which information is contained in the delay start signal received via the start line 42. From this information a load signal is derived, which is such that the resultant sensor signals appear delayed by a delay time tv relative to the direction-of-movement-corrected substitute sensor signals. In FIG. 5 this is shown symbolically in such a manner that the preferably pulse-shaped load signal closes switches via a load signal line 54, which switches transfer the direction-of-movement-corrected substitute sensor signals from the lines 49 to a sensor signal output stage 55 when the load signal appears. Upon this transfer, the direction-of-movement-corrected substitute sensor signals are also available as resultant sensor signals on the line 27 in order to be supplied to the waveform generator 28. The delay by the delay time tv is thus simply obtained by a delayed loading of the direction-of-movement-corrected substitute sensor signals into the sensor signal output stage 55. In a modification of the present example the switches in the lines 49, which are controlled by the load signal line 54, can also be combined conceptually with the sensor signal output stage 55. The load signal line 54 is then coupled directly to the sensor signal output stage 55.

Figure 6:
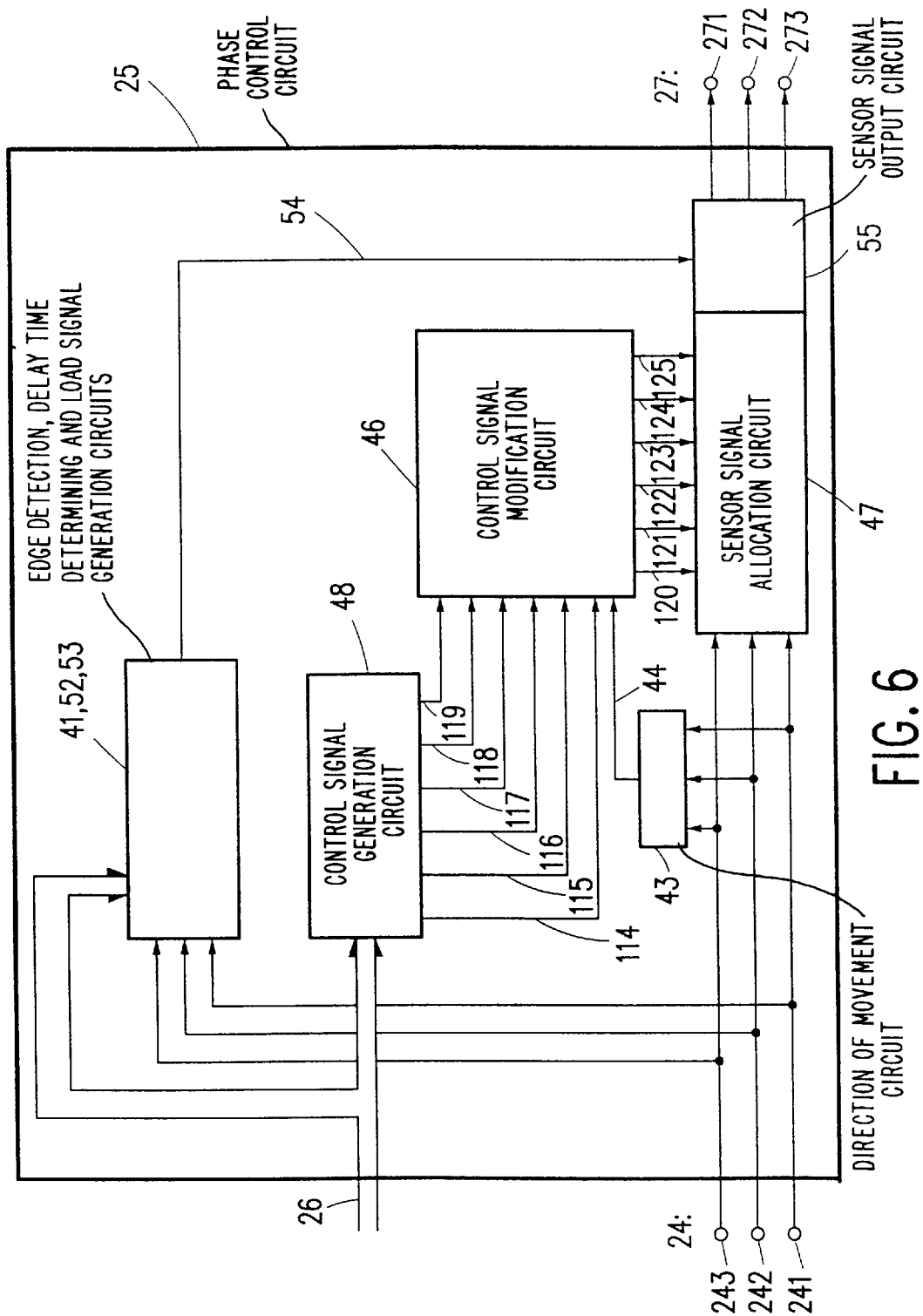
FIG. 6 is a block diagram of an example of a phase control stage of the electrical drive arrangement in accordance with the invention.

FIG. 6 shows a general block diagram of a practical example of the phase control stage of the electrical drive arrangement in accordance with the invention. FIGS. 7 to 11 by way of example show detailed diagrams corresponding to the circuit blocks in FIG. 6. FIGS. 6 to 11 will therefore be described jointly hereinafter. In the description it has been assumed that the sensor signals on the lines 24 have the waveforms as shown in FIGS. 2 to 4.

Figure 7:
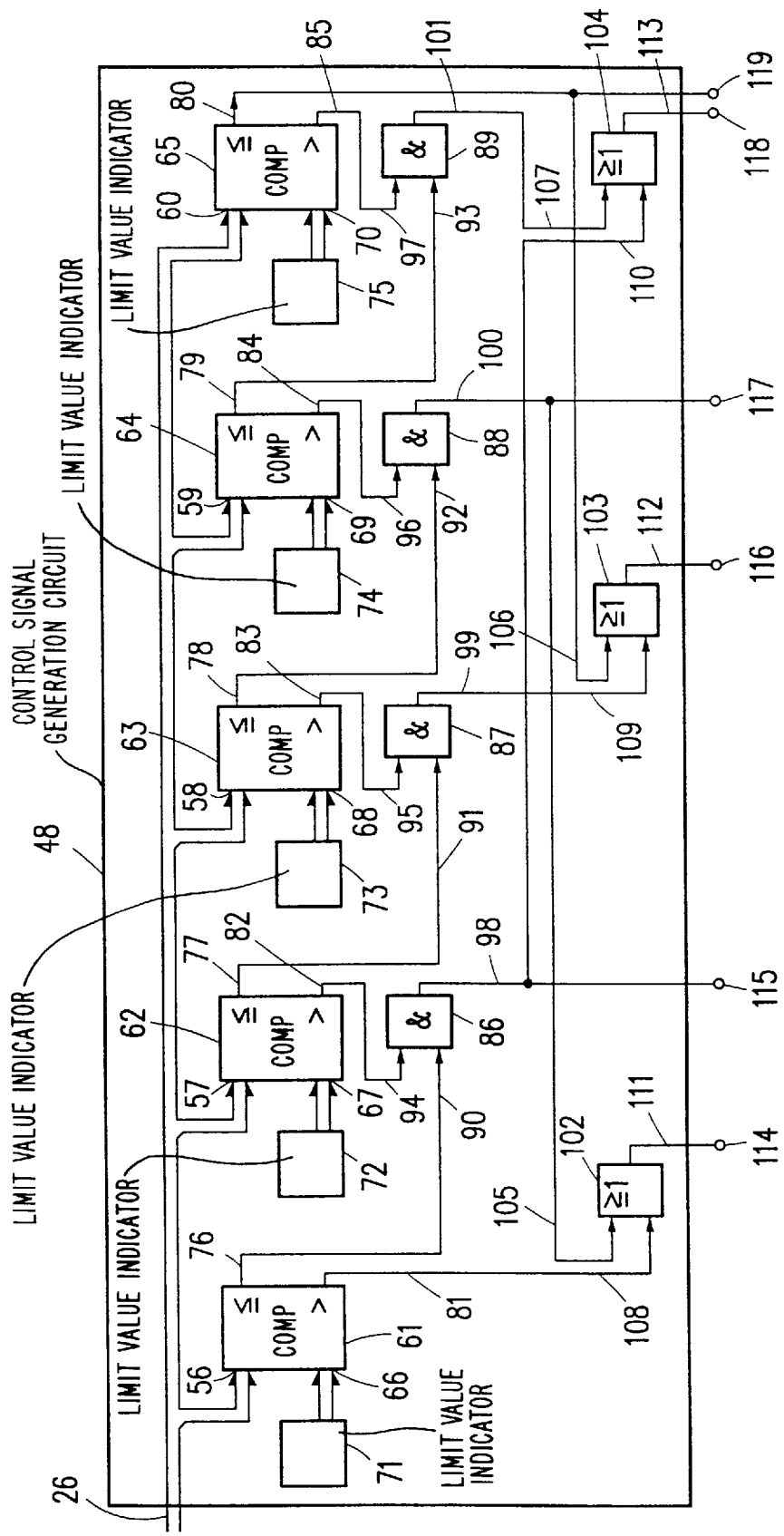
FIG. 7 is a detailed block diagram of an example of a control signal generating stage in the phase control stage.

In the control signal generation stage 48 of FIG. 7 the line 26 for the signal with the information about the desired value for the phase relationship of the sensor signals, i.e. with the information about the phase angle PHI, is connected to first inputs 56, 57, 58, 59 and 60 of a first, a second, a third, a fourth and a fifth comparator 61, 62, 63, 64 and 65, respectively. The information about the desired phase angle PHI is transmitted as a digital signal via the line 26. The comparators 61, 62, 63, 64 and 65 each have a second input 66, 67, 68, 69 and 70, respectively, connected to a limit-value indicator 71, 72, 73, 74 and 75, respectively. Each of the comparators 61 to 65 has a first output 76, 77, 78, 79 and 80, respectively, and a second output 81, 82, 83, 84 and 85, respectively.

As already explained with reference to FIGS. 2 to 4, the choice of the substitute sensor signal for each of the sensor signals from the collection of all the sensor signals depends on the fact between which of the edges of the sensor signals the rising signal edge of the resultant sensor signal (in the example of FIGS. 2 to 4) will be situated in conformity with the desired phase angle PHI. To determine first of all the relevant interval between two of the signal edges for a given phase angle PHI, the desired value for the phase angle PHI applied via the line 26 is compared with the phase relationships of the signal edges of the sensor signals. The phase relationships are given by the limit value indicators 71 to 75; comparison is effected in the comparators 61 to 65. The first limit value indicator 71 then supplies a limit value (in the form of a phase angle or a phase relationship) which corresponds to the instant t2 in the diagram of FIG. 2, the zero crossing t1 of the voltage d1 induced in the first phase winding 3 by the rotor 2 being referred to as the zero point for defining the phase relationships or phase angles and, in particular, also for the phase angle PHI. The first limit value indicator 71 thus supplies a limit value corresponding to the phase angle PHI in FIG. 2; the other limit value indicators 72 to 75 supply limit values which are each time incremented by a spacing between two signal edges of the sensor signals, corresponding to the phase relationships of the successive sensor signal edges starting from the instant t1 in FIG. 2. The phase angle PHI in FIG. 2 is for example −30° and the signal edges of the sensor signals of FIGS. 2a) to 2c) have such phase relationships that they are 60° spaced apart. The first limit value indicator 71 then supplies a limit value of PHI=−30°. The second limit value indicator 72 supplies a value incremented by the spacing between two signal edges of the sensor signals, i.e. by 60°, in the direction of the phase angle PHI. In the present numerical example the second limit value supplied by the second limit value indicator 72 is consequently −90°. Likewise, the third limit value indicator 73 supplies a third limit value of −150°, the fourth limit value indicator 74 a fourth limit value of −210°, and the fifth limit value indicator 75 a fifth limit value of −270°. The comparators 61 to 65 compare the signals applied to the first inputs 56, 57, 58, 59 and 60 with the respective limit values applied to the second inputs 66, 67, 68, 69 and 70 by the limit value indicators 71, 72, 73, 74 and 75. The result of this comparison appears as a binary signal on the first and second outputs 76 to 80 and 81 to 85, respectively. Each comparator produces a logic 1 on its second output if the signal on the first input exceeds the limit value applied to the second input. In the other case, a logic 1 appears on the first output of the comparator. The respective other output of the comparator then carries a logic 0. In the present numerical example this means that in the case of a desired phase angle PHI of −45°, which is smaller than the first limit value −30° of the first limit value indicator 71, the first comparator 61 produces a logic 1 on its first output 76 and a logic 0 on its second output. The other comparators 62 to 65, for which the phase angle PHI of −45° exceeds the respective limit values of −90°, −150°, −210° and −270°, produce a logic 0 on their first outputs 77 to 80 and a logic 1 on their second outputs 82 to 85.

The control signal generation stage 48 shown in FIG. 7 further comprises a first, a second, a third and a fourth AND gate 86, 87, 88 and 89, respectively. These AND gates 86 to 89 have their first inputs 90, 91, 92 and 93 connected to the first outputs 76, 77, 78 and 79, respectively, of the first, the second, the third and the fourth comparator 61, 62, 63 and 64, respectively, and their second inputs 94 to 97 to the second outputs 82, 83, 84 and 85 of the second, the third, the fourth and the fifth comparator 62, 63, 64 and 65, respectively. The control signal generation stage 48 finally comprises three OR gates 102, 103 and 104. The first OR gate 102 has a first input connected to an output 100 of the third AND gate 88, the second OR gate 103 has first input 106 connected to the first output 80 of the fifth comparator 65, and the third OR gate 104 has a first input 107 connected to an output 101 of the fourth AND gate 89. Likewise, a connection has been made from a second input 108 of the first OR gate 102 to the second output of the first comparator 61, from a second input 109 of the second OR gate 103 to an output 99 of the second AND gate 87, and from a second input 110 of the third OR gate 104 to an output 98 of the first AND gate 86. Similarly, the second OR gate 103 has an output 112 connected to a terminal of a third control signal line 116 and the third OR gate 104 has an output 113 connected to a terminal of a fifth control signal line 118. The outputs 98 and 100 of the first and the third AND gate 86 and 88, respectively, are connected to terminals for a second and a fourth control signal line 115 and 117, respectively, and the first output 80 of the fifth comparator 65 is coupled to a terminal for a sixth control signal line 119.

The control signal generation stage 48 supplies control signals via the control signal lines 114 to 119, which control signals contain information about the choice of one of the sensor signals as substitute sensor signal for one of the sensor signals. As this choice changes from one range between two limit values to the next one, the information provided by the control signals on the control signal lines 114 to 119 is equivalent to information about the limit-value range in which the desired phase angle PHI lies. In the present example, where PHI=−45°, this results in a logic 1 on the second and fifth control signal lines 115 and 118 and a logic 0 on the other control signal lines 114, 116, 117 and 119.

Fog. 10 shows an example of a control signal modification stage 46. The control signal modification stage 46 has seven inputs, of which six inputs are each connected to one of the control signal lines 114 to 119 and of which the seventh one is connected to the direction-of-movement signal line 44. The control signal modification stage 46 further has six outputs, each connected to a line for a direction-of-movement-corrected control signal. The control signal modification stage 46 provides the coupling between the control signals on the control signal lines 114 to 119 and the direction-of-movement-corrected control signals on he relevant lines, which bear the reference numerals 120 to 125 in FIG. 10. This coupling process is controlled by the direction-of-movement signal from the direction-of-movement signal line 14. In the control signal modification stage 46 the first control signal line 114 is connected directly to the first line 120 for the first direction-of-movement-corrected control signal, and the fourth control signal line 117 is connected directly to the fourth line for the direction-of-movement-corrected control signal. The third and the fifth control signal line 116 and 118 are connected to the third and the fifth line 122 and 124 for the third and the fifth direction-of-movement-corrected control signal, respectively, via a first logic circuit 126. A second logic circuit 127 identical to the first logic circuit 126 connects the second and sixth control signal lines 115 and 119 to the second and the sixth line 121 and 125 for the second and the sixth direction-of-movement-corrected control signal, respectively. Depending on the value of the direction-of-movement signal the logic circuits 126 and 127, which are moreover connected to the direction-of-movement signal line 44, enable the coupling for the third and the fifth control signal line 116 and 118 with the third and the fifth line 122 and 124, respectively, and likewise the coupling between the second and the sixth control signal line 115 and 119 with the second and the sixth line 121 and 125, respectively, to be interchanged.

The construction of the logic circuits 126, 127 will be described by way of example for the first logic circuit 126. The reference symbols for the elements of the identical second logic circuit 127 are given in parentheses.

A first AND gate 130 (160) of the first (second) logic circuit 126 (127) has its first input 131 (161) connected to the third (sixth) control signal line 116 (119) and its second input 132 (162) to the direction-of-movement signal line 44. An output 133 (163) of the first AND gate 130 (160) is connected to a first input 135 (165) of a first OR gate 134 (164) of the first (second) logic circuit 126 (127). A second input 136 (166) also forms an output of a second AND gate 137 (167), which has its first input 138 (168) connected to the fifth (second) control signal line and its second input 139 (169) to an output 141 (171) of an inverter 140 (170). The inverter 140 (170) has an input 142 (172) connected to the direction-of-movement signal line 44. The output 141 (171) of the inverter 140 (170) also forms a first input of a third AND gate 143 (173), whose second input 144 (174) is connected to the third (sixth) control signal line 116 (119).

A fourth AND gate 146 (176) has its first input 147 (177) connected to the fifth (second) control signal line 118 (115). A second input 148 (178) of the fourth AND gate 146 (176) is connected to the direction-of-movement signal line 44.

The third AND gate 143 (173) and the fourth AND gate 146 (176) have their respective outputs 145 (175) and 149 (179) connected to, respectively, a first input 151 (181) and a second input 152 (182) of a second OR gate 150 (180). An output 153 (183) of the first OR gate 134 (164) is connected to the third (sixth) line 122 (125) for the third (sixth) direction-of-movement-corrected control signal. An output 154 (184) of the second OR gate 150 (180) is connected to the fifth (second) line 124 (121) for the fifth (second) direction-of-movement-corrected control signal.

With the present logic circuits 126, 127 the second, the third, the fifth and the sixth control signal line 115, 116, 118 and 119, respectively, are connected to the second, the third, the fifth and the sixth line 121, 122, 124 and 125, respectively, for the corresponding direction-of-movement-corrected control signal, if the direction-of-movement signal on the direction-of-movement signal line 44 is a logic 1. If instead of this, said line carries a logic 0, the logic circuits 126, 127 of the control signal modification stage 46 will make the following connections: the second control signal line 115 to the sixth line 125, the sixth control signal line 119 to the second line 121, the third control signal 116 to the fifth line 124, and the fifth control signal line 118 to the third line 122.

In the numerical example for a phase angle PHI of −45° a logic 1 is obtained in the case of a logic 1 for the direction-of-movement signal on the second line 121 and the fifth line 124, while a logic 0 appears if the direction-of-movement signal on the third line 122 and the sixth line 125 are logic 1. The other signals on the lines 120 to 125 each time correspond to logic 0 level.

Figure 11:
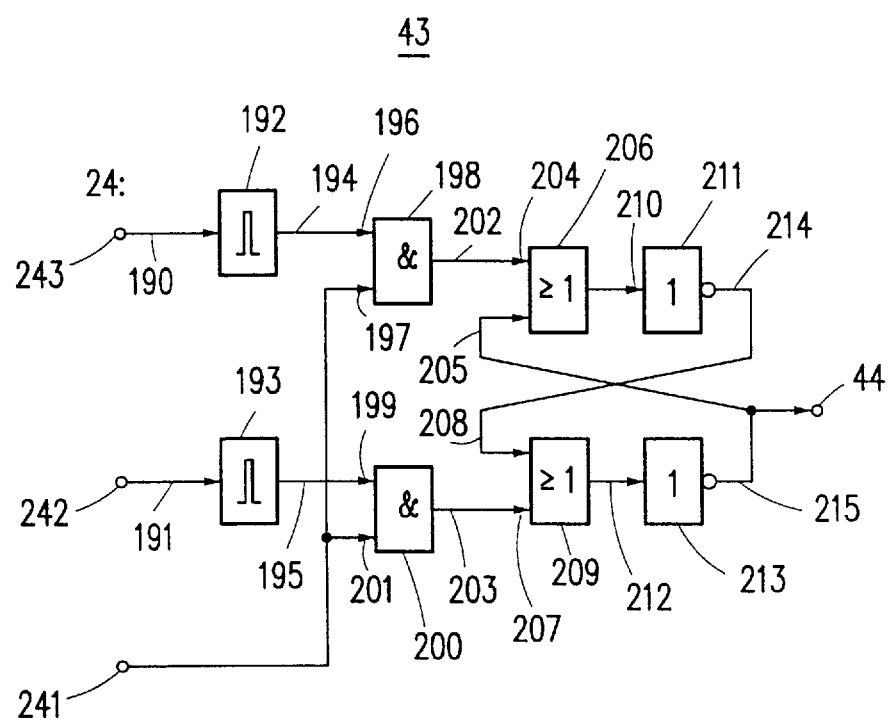
FIG. 11 shows an example of a direction-of-movement detection stage for the phase control stage shown in FIG. 6.

The direction-of-movement signal on the direction-of-movement signal line 44 is generated by means of a direction-of-movement detection stage 43 and are derived from the sensor signals supplied by the position sensor device 23 via the line 24. FIG. 11 shows an example of such a direction-of-movement detection stage 43. In this example the line 24 comprises three conductors, of which a first one 241 carries the sensor signal associated with the first phase winding 3. The second conductor 242 carries the sensor signal associated with the second phase winding 4 and the third conductor 243 serves to supply the third sensor signal associated with the third phase winding 5. The sensor signals are then preferably as shown in FIGS. 2*a* to 2*c*. The second and the third conductor 242, 243 are each connected to a first and a second monostable multivibrator 192 and 193, respectively. The monostable multivibrators 192, 193 have been constructed in such a manner that upon the appearance of a rising signal edge in the second sensor signal (shown in FIG. 2*b*) or in the third sensor signal (shown in FIG. 2*c*) they generate a signal pulse from logic 0 to logic 1 on the second conductor 242 and the third conductor 243, respectively, which pulse is short relative to the time interval between two successive signal edges in the sensor signals. These pulses are applied from the output 194 of the first monostable multivibrator 192 to a first input 196 of a first AND gate 198 of the direction-of-movement detection stage 43; the pulses produced on the output 195 of the second monostable multivibrator 193 are applied to a first input 199 of a second AND gate 200 of the direction-of-movement detection stage 43. A second input 197 of the first AND gate 198 and a second input 201 of the second AND gate 200 are both connected to the first conductor for applying the first sensor signal (associated with the first phase winding 3; preferably having a waveform as shown in FIG. 2*a*)).

The AND gates 198, 200 have their respective outputs 202 and 203 connected to inputs of a bistable multivibrator. The first one of these inputs is formed by a first input 204 of a first OR gate 206 of the direction-of-movement detection stage 43 and the second one of these inputs is formed by a first input 207 of a second OR gate 209 of the direction-of-movement detection stage 43. An output 210 of the first OR gate 206 also forms an input of a first inverter 211 of the direction-of-movement detection stage 43. Likewise, an output 212 of the second OR gate 209 forms an input of a second inverter 213 of the direction-of-movement detection stage 43. The first inverter 211 has its output 214 connected to a second input 208 of the second OR gate 209, and the second inverter 213 has its output 215 connected to a second input 205 of the first OR gate 206.

This bistable multivibrator circuit, which is known per se and whose output is constituted by the output 215 of the second inverter 213, which is connected to the direction-of-movement signal line 44, is switched to a first switching state by a pulse on the first input 204 of the first OR gate 206, which state is sustained until a similar pulse appears on the first input 207 of the second OR gate 209. In said first switching state the direction-of-movement signal on the direction-of-movement signal line 44 assumes a logic 1 level and in the second switching state of the bistable multivibrator it assumes a logic 0 level. In the direction of movement presumed for the sensor signal waveforms in FIGS. 2*a*) to 2*c*) the rising signal edges of the second sensor signal of FIG. 2*b*) and hence the pulses on the output 195 of the second monostable multivibrator 193 always coincide with a logic 0 level of the first sensor signal of FIG. 2*a*, whereas the first sensor signal of FIG. 2*a* always assumes a logic 1 value upon the occurrence of pulses from the first monostable multivibrator 192 (as a result of rising signal edges in the third sensor signal of FIG. 2*c*). Likewise, the first AND gate 198 is turned on for the pulses from the first monostable multivibrator 192 and the second AND gate 200 is closed for the pulses from the second monostable multivibrator 193. he subsequent bistable multivibrator circuit 206, 209, 211, 213 then sets the direction-of-movement signal to logic 1. For the opposite direction of movement the waveforms of the second and the third sensor signal in accordance with FIGS. 2*b*) and 2*c*) are interchanged. The bistable multivibrator 206, 209, 211, 213 then receives only pulses from the second monostable multivibrator 193, so that the direction-of-movement signal changes to logic 0.

Figure 9:
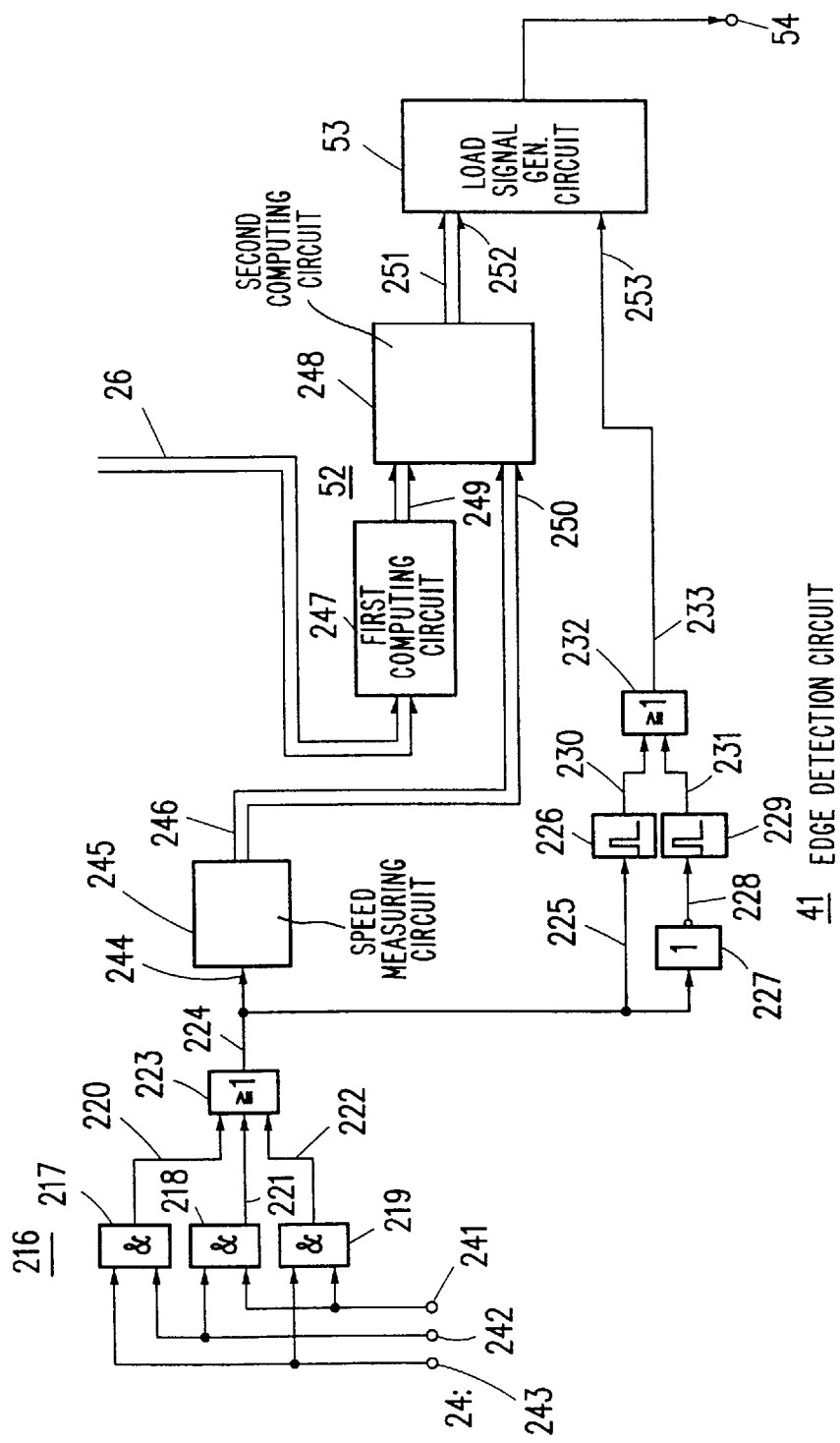
FIG. 9 shows an example of a delay time measuring stage, a load signal generating stage with edge detection of the sensor signals and a speed measuring stage in the phase control stage of FIG. 6.
Figure 10:
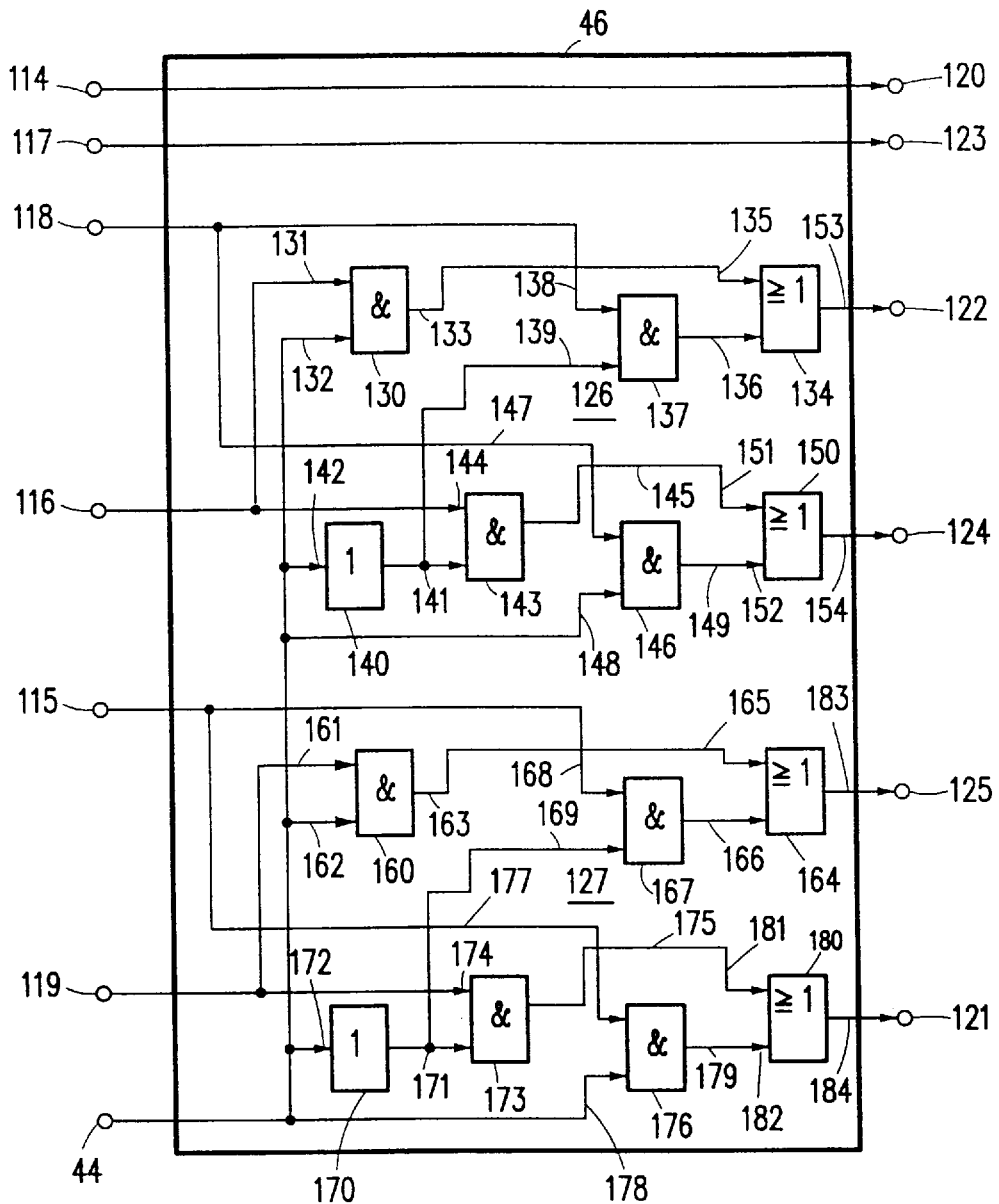
FIG. 10 shows an example of a control signal modifying stage within the phase control stage of FIG. 6.

FIG. 9 shows those elements of the circuit block in FIG. 6, which serve for generating the load signal on the load signal line 54 from the sensor signals and the desired value for the phase relationship of the sensor signals or the phase angle PHI on the line 26. An input stage 216 serves to form a rectangular signal of three times the frequency of the sensor signals or the fundamental wave d2 of the phase voltage across the respective phase windings 3, 4 and 5 of the electric motor 1. For this purpose, the input stage 216 comprises three AND gates 217, 218 and 219. A first one 217 of these AND gates has its inputs connected to, respectively, the second conductor 242 and the third conductor 243 of the line 24. Likewise, the second AND gate 218 has its inputs connected to, respectively, the first conductor 241 and the second conductor 242, and the third AND gate 219 has its inputs connected to, respectively, first second conductor 241 and the third conductor 243. Outputs 220, 221 and 222 of the AND gates 217, 218 and 219, respectively, form three inputs of an OR gate 223, on whose output 224 said rectangular signal of three times the frequency of the fundamental wave d2 of the phase voltage (cf. FIG. 2d)) is available. This rectangular signal consequently has one signal edge for each signal edge of the three sensor signals.

The circuit block in FIG. 9 further comprises an edge detection stage 41, to which the above-mentioned rectangular signal from the output 224 of the OR gate 223 is applied. For this purpose, this output 224 is connected directly to an input 225 of a first monostable multivibrator 226 of the edge detection stage 41 and, via an inverter 227, to an input 228 of a second monostable multivibrator 229. The functions of the two monostable multivibrators 226, 229 of the edge detection stage 41 correspond to those of the monostable multivibrators 192, 193 of the direction-of-movement detection stage 43 in FIG. 11. Thus, a short pulse towards logic 1 is produced on the output 230 of the first monostable multivibrator 226 of the edge detection stage 41 upon each rising signal edge in the rectangular signal from the output 224, while the second monostable multivibrator 229 produces such a pulse on its output 231 upon each falling signal edge of the rectangular signal from the output 224. The outputs 230, 231 of the monostable multivibrators 226, 229 also form inputs of an OR gate 233 of the edge detection stage 41. A pulse-shaped signal is then produced on the output 233, which signal comprises a short pulse towards logic 1 for each of the signal edges of the sensor signals and which serves as the trigger signal for the load signal generating stage 53.

Moreover, the output 224 of the OR gate 223 of the input stage 216 is connected to an input 244 of a speed measuring stage 245. Alternatively, the input 244 may be connected to the output 233 of the OR gate 233 of the edge detection stage 41. In both cases the speed measuring stage 245 receives a signal with information about the time interval between two edges of the sensor signals. The speed measuring stage 245 constantly compares this interval with a time standard and derives from this comparison a speed signal, which is representative of the speed of movement and which appears on an output 246 of the speed measuring stage 245. The time standard can be, for example, a clock signal having a stable frequency which is high relative to the maximum frequency of the rectangular signal from the output 224. The speed measuring stage 245 can then count the periods of this clock signal appearing between two edges of the rectangular signal (or tow pulses of the trigger signal on the output 233). The number of clock periods thus determined, which is a measure of the time interval between two edges of the rectangular signal, is inversely proportional to the speed of movement of the rotor 2. The speed signal preferably takes the form of a (multi-digit) binary signal.

In the present example the speed measuring stage 245 shown in FIG. 9 fulfills the tasks of the tachogenerator of FIGS. 1 and 5. Thus, in the case of a circuit as shown in FIG. 9 the electrical drive arrangement in accordance with the invention can be constructed without a separate tachogenerator.

The circuit block shown in FIG. 9 further comprises a delay time determining stage 52. This stage comprises a first computing stage 247 and a second computing stage 248. The signal with the information about the desired value for the phase relationship of the sensor signals, i.e. about the desired value of the phase angle PHI, is applied to the first computing stage 247. In the first computing stage 247 the desired value is subjected to a residual-class division, in which the divisor corresponds to the phase angle between two successive signal edges of the sensor signals or of the rectangular signal on the output 224 of the OR gate 223, or the interval between two successive pulses of the trigger signal on the output 233 of the OR gate 232. This results in a digital signal on the output 249 of the first computing stage 247, which signal corresponds to the remainder of this residual-class division of the desired value for the phase angle PHI. In the present example, a modulo 60° division is performed in the first computing stage 247. The remainder of this division is then further used as information about the delay required in the phase control stage 25 for the substitute sensor signal or the direction-of-movement-corrected substitute sensor signal, while the integral multiples of 60° of the desired value dropped from the phase angle PHI during the residual-class division are taken into account by a suitable choice of one of the sensor signals as the substitute sensor signal or the direction-of-movement-corrected substitute sensor signal.

The signal corresponding to the remainder of the residual-class division in the first computing stage is applied to the second computing stage 248 via the output 249 of the first computing stage 247, which output also forms a first input of the second computing stage 248. The (digital) speed signal is applied from the output 246 of the speed measuring stage 245 to the second computing stage 248 via a second input 250. The second computing stage 248 processes the applied signals in such a manner that the remainder of the residual-class division is divided by the speed of movement of the rotor 2, or the remainder is multiplied by the speed signal which is inversely proportional to the speed of movement. On the output 251 of the second computing stage 248 this results directly in a (digital) signal which is representative of the actual value for the delay time tv.

The output 251 of the second computing stage 248 of the delay time determining stage 52 is connected to a preset input 252 of the load signal generating stage 53. The load signal generating stage 53 further comprises a trigger signal input 253 connected to the output 233 of the OR gate 232 of the edge detection stage 41. The load signal generating stage 53 is preferably constructed as a timer circuit, which is preferably operated with the same clock signal used as the time standard in the speed measuring stage 245. The load signal generating stage 53 is preset to the value of the delay time tv, applied via the preset input 252, in each period of the trigger signal, which is effected in response to the leading edge of the pulses of this trigger signal. Subsequently, counting down from the preset value to 0 is effected in the rhythm of said clock signal. When the count 0 is reached the desired delay time tv has just expired, starting from the beginning of the last pulse of the trigger signal. When the count 0 is reached the load signal generating stage 53 therefore produces a load signal on the load signal line 54, which signal takes the form of a pulse which is short relative to the time interval between two successive pulses of the trigger signal.

Figure 8:
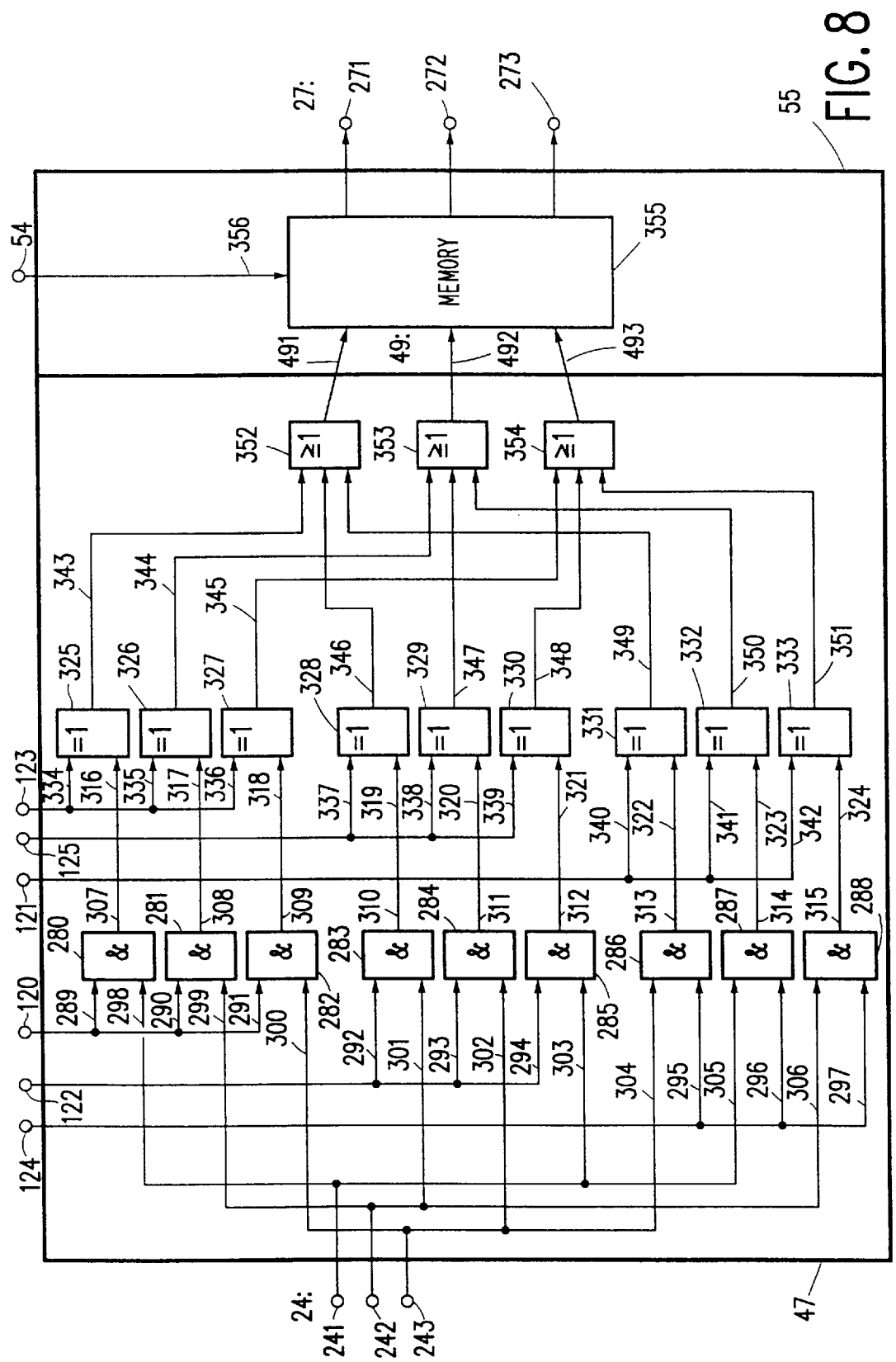
FIG. 8 shows an example of a sensor signal allocation stage and a sensor signal output stage in the phase control stage shown in FIG. 6.

FIG. 8 is a detailed logic circuit diagram of an example of a sensor signal allocation stage 47 and an example of a sensor signal output stage 55. The sensor signal output stage 47 comprises nine AND gates 280 to 288 in total, arranged in three groups 280 to 282, 283 to 285, and 286 to 288. The AND gates 280 to 282 of the first group have first inputs 289, 290 and 291, respectively, connected to the first line 120 for the first direction-of-movement-corrected control signal. First inputs 292, 293 and 294 of the second group of AND gates 283 to 285, respectively, are connected to the third line 122 for the third direction-of-movement-corrected control signal, and first inputs 295, 296 and 297 of the third group of AND gates 286 to 288, respectively, are connected to the fifth line 124 for the fifth direction-of-movement-corrected control signal.

In each of the groups of AND gates 280 to 282, 283 to 285, and 286 to 288 one of the AND gates is connected to one conductor of the line 24 for the sensor signals. In particular, the second terminals 298, 303 and 305 of the first, the sixth and the eighth AND gate 280, 285 and 287, respectively, are connected to the first conductor 241, the second inputs 299, 301 and 306 of the second, the fourth and the ninth AND gate 281, 283 and 288, respectively, to the second conductor 242, and the second inputs 300, 302 and 304 of the third, the fifth and the seventh AND gate 282, 284 and 286, respectively, to the third conductor 243.

The AND gates 280 to 288 have their outputs 307 to 315 connected to first inputs 316 to 324 of a total of nine controlled inverters 325 to 333, which inverters are each associated with one of the AND gates 280 to 288 and which are consequently also arranged in a first, a second and a third group 325 to 327, 328 to 330, and 331 to 333. The controlled inverters 325 to 327 of the first group each have a second input 334 to 336 connected to the fourth line 123 for the fourth movement-corrected control signal. Likewise, the controlled inverters 328, 329, 330 of the second group each have a second input 337, 338, 339 connected to the sixth line 125 for the sixth movement-corrected control signal, and the controlled inverters 331, 332, 333 of the third group each have a second input 340, 341, 342 connected to the second line 121 for the second movement-corrected control signal.

The controlled inverters 325 to 333, which may also be referred to as EXCLUSIVE-OR elements, transfer the signals appearing on their respective first inputs 316 to 324 to their outputs 343 to 3561, respectively, each time that a logic 1 is applied to their second inputs 334 to 342. However, if a logic 0 is applied to the second inputs 334 to 342, the inverse of the signal on the first input 316 to 324 appears on the output 343 to 351.

The outputs 343 to 345 of the first group of controlled inverters 325 to 327 each form a first input of a first, s second and a third OR gate 352, 353 and 354, respectively. In the same way, the outputs 346 to 348 of the second group of controlled inverters 328 to 330 each form a second input of the three OR gates 352 to 354, and the outputs 349 to 351 of the third group of controlled inverters 331 to 333 each form a third input of the three OR gates 352 to 354. Thus, the OR gates 352 to 354 perform the function of branching the outputs 343 to 345, 346 to 348, and 349 to 351, respectively, to a first, a second and a third conductor of the lines 49 for the direction-of-movement-corrected substitute sensor signals, which conductors 491, 492 and 493 form outputs of the OR gates 352, 353 and 354.

The direction-of-movement-corrected substitute sensor signals on the lines 49 are derived from the sensor signals on the line 24 in the sensor signal allocation stage 47 in two steps. In the first step the AND gates 280 to 288—under control of the first, the third and the fifth direction-of-movement-corrected control signal—the individual sensor signals are allocated to the signal paths for the direction-of-movement-corrected substitute sensor signals, as is necessary for the required phase angles PHI. In the present example, there are three possibilities for this allocation. The first direction-of-movement corrected sensor signal on the first conductor 491 can be derived from the first sensor signal on the line 241, the second sensor signal on the conductor 242 or the third sensor signal on the conductor 243. For these three possibilities fixed allocations result, also for the other direction-of-movement corrected substitute sensor signals on the conductors 492 and 493. For each of these allocation possibilities one of the groups of AND gates 280 to 282, 283 to 285, and 286 to 288 has been provided. Since each time only of the three possibilities is appropriate, only one of the three direction-of-movement corrected control signals on the lines 120, 122 and 124 will assume a logic 1 value. As a result, only one group of AND gates is open and the other ones are closed.

From the group of AND gates 280 to 282, 283 to 285, and 286 to 288 which are open, the correspondingly interchanged sensor signals are applied to the allocated groups of controlled inverters 325 to 327, 328 to 330, and 331 to 333. Depending on the phase angle PHI the sensor signals must be inverted or must not be inverted, as described. This is achieved by means of the second, the fourth and the sixth direction-of-movement corrected control signal on the second, fourth and sixth lines 121, 123 and 125, respectively. The direction-of-movement corrected control signals to the groups of controlled inverters, for which the associated groups of AND gates are closed, are set to the logic 0 value by the control signal generation stage 48 and the control signal modification stage 46. Thus, the outputs of these controlled inverters are logic 0, which does not influence the OR gates 352 to 354. For the group of AND gates which are not opened by the corresponding direction-of-movement corrected control signal the subsequent group of controlled inverts can transfer the sensor signals at option in inverted or non-inverted form. Without any further change these signals reach the conductors 491 to 493 as direction-of-movement corrected substitute sensor signals via the OR gates 352 to 354.

The sensor signal output stage 55 shown in FIG. 8 comprises an output memory 355 for the three binary direction-of-movement corrected substitute sensor signals. The conductors 491 to 493 form the inputs for the binary direction-of-movement corrected substitute sensor signals to be stored. A first, a second and a third conductor 271, 272 and 273, respectively, of the line 27 for the resultant sensor signals form a second and a third output of the output memory 355 for the signals stored therein. The output memory 355 has a load signal input 356 connected to the load signal line 54.

If the transit times in the gates are ignored, the direction-of-movement corrected substitute sensor signals on the lines 49 are available on the line 24 simultaneously with the sensor signals. The output memory 355 is constructed in such a manner that upon the occurrence of a pulse in the load signal on the load signal line 54 the signal values available on the inputs, i.e. on the conductors 491 to 493, at this instant are loaded into the output memory 355 and appear unchanged at the outputs 271 to 273 until a subsequent pulse of the load signal load the signal values which then appear on the conductors 491 to 493 into the output memory 355. Thus, the resultant sensor signals, which have been delayed by the delay time tv relative to the direction-of-movement corrected substitute sensor signals, are obtained in a very simple manner.

FIG. 6 shows the combination of the circuit blocks of FIGS. 7 to 11. The connection by means of the control signal lines 114 to 119 and the connection by means of the lines 120 to 125 for the direction-of-movement corrected control signals have replaced the connection 50 for the control signals and the connection 51 for the information about the direction-of-movement correction in the example shown in FIG. 5. However, this modification is not a departure from the principle of the electrical drive arrangement in accordance with the invention.

We claim:

1. An electrical drive arrangement for an electric motor including a stator having a plurality of phase windings, and a rotor, the drive arrangement including:

an electronic commutation circuit adapted to be coupled to supply electric power to the phase windings of the electric motor, a position sensor device supplying a sensor signal for each phase winding of the electric motor in dependence upon an instantaneous position of the rotor relative to the stator, each of the sensor signals having a phase relationship with respect to the position of the rotor, a phase control circuit coupled to receive the sensor signals and provide resultant sensor signals having a phase-shifted relationship relative to the phase relationship of the sensor signals which depends at least on rotor movement speed and which is uniform for all the sensor signals.

a waveform generator coupled to receive the resultant sensor signals and provide to the commutation circuit commutation signals for the associated phase winding from each of the resultant sensor signals, and a control circuit coupled to the waveform generator which provides commutation control signals that cause the commutation circuit to set an amplitude and a phase shift of the electric power to be supplied to the phase windings of the electric motor in dependence upon at least the rotor movement speed, the phase control circuit including:

a control signal generation circuit coupled to the control circuit which, for current values of the phase shift set by the control circuit supplies respective phase control signals having the phase-shifted relationship of respective resultant sensor signals, a sensor signal allocation circuit coupled to receive the sensor signals from the position sensor device and provide substitute sensor signals selected for each sensor signal to have the phase-shifted relationship of the respective resultant sensor signal under control of the phase control signals, a delay time determining circuit for determining, from a current phase shift set by the control circuit, the rotor movement speed and a spacing between the phases of the sensor signals along a movement coordinate describing the position of the rotor, a time interval corresponding to a delay between respective substitute sensor signals and resultant sensor signals, a sensor signal output circuit coupled to receive the substitute sensor signals and, in response to a load signal, provide the resultant sensor signals, and a load signal generating circuit which, responsive to each change in value of one of the sensor signals or the substitute sensor signals, provides the load signal delayed relative to the change in value by the time interval determined in the delay time determining circuit.

2. An electrical drive arrangement as claimed in claim 1, further including a control signal modification circuit coupled to receive the phase control signals from the control signal generation circuit and a direction-of-movement signal and in response thereto provide chase control signals which are modified in accordance with the direction of movement of the rotor.

3. An electrical drive arrangement as claimed in claim 2, further including a direction-of-movement detection stage for detecting the direction of movement of the rotor and for supplying the direction-of-movement signal to the control signal modification circuit.

4. An electrical drive arrangement as claimed in claim 3, wherein the direction-of-movement detection circuit determines the direction of movement by means of a comparison of the phase relationship of at least two of the sensor signals.

5. An electrical drive arrangement as claimed in claim 1, further including a speed measuring circuit for determining the rotor movement speed.

6. An electrical drive arrangement as claimed in claim 5, wherein the speed measuring circuit is coupled to receive the sensor signals and compares a succession in time of given portions of the sensor signals with a time standard supplied by the speed measuring circuit, and provides a speed signal representative of the rotor movement speed to the delay time determining circuit.

7. An electrical drive arrangement as claimed in claim 1, wherein the position sensor device generates the sensor signals at least from portions of voltages induced in the stator by the movement of the rotor, and wherein the phase-shifted relationship of the resultant sensor signals determines the phase relationship of the associated induced voltages.

8. An electrical drive arrangement as claimed in claim 1, wherein the position sensor device generates rectangular sensor signals, whose edges form a measure of the position of the rotor relative to the associated phase winding.

9. An electrical drive arrangement as claimed in claim 8, wherein the rectangular sensor signals have a duty cycle of at least 50% and their phases are cyclically substantially equispaced over one cycle of movement of the rotor.

* * * * *